(12) United States Patent
Kiuru et al.

(10) Patent No.: US 12,167,721 B2
(45) Date of Patent: Dec. 17, 2024

(54) WATER TREATMENT SYSTEM FOR A RECIRCULATION AQUACULTURE FACILITY

(71) Applicant: LUONNONVARAKESKUS, Helsinki (FI)

(72) Inventors: Tapio Kiuru, Laukaa (FI); Jouni Vielma, Jyväskylä (FI)

(73) Assignee: LUONNONVARAKESKUS, Helsinki (FI)

( * ) Notice: Subject to any disclaimer, the term of this patent is extended or adjusted under 35 U.S.C. 154(b) by 761 days.

(21) Appl. No.: 17/266,472

(22) PCT Filed: Aug. 5, 2019

(86) PCT No.: PCT/EP2019/070988
§ 371 (c)(1),
(2) Date: Feb. 5, 2021

(87) PCT Pub. No.: WO2020/030574
PCT Pub. Date: Feb. 13, 2020

(65) Prior Publication Data
US 2021/0298275 A1     Sep. 30, 2021

(30) Foreign Application Priority Data

Aug. 6, 2018 (FI) .................................... 20185673

(51) Int. Cl.
*A01K 63/04* (2006.01)
*A01K 61/00* (2017.01)
(Continued)

(52) U.S. Cl.
CPC ............ *A01K 63/045* (2013.01); *A01K 61/10* (2017.01); *C02F 3/302* (2013.01); *A01K 61/00* (2013.01)

(58) Field of Classification Search
CPC ...... A01K 63/04; A01K 63/045; A01K 61/10; A01K 61/00; C02F 2103/20; C02F 3/302; C02F 3/046
(Continued)

(56) References Cited

U.S. PATENT DOCUMENTS 6,447,681 B1 * 9/2002 Carlberg ................. C02F 3/327
                                                          210/219
9,011,689 B1    4/2015 Czarnecki
(Continued)

FOREIGN PATENT DOCUMENTS

CN       101407360       4/2009
CN       204317302       5/2015
(Continued)

OTHER PUBLICATIONS

Gao et al., English Machine translation CN 101407360 A, pp. 1-6 (Year: 2009).*
(Continued)

*Primary Examiner* — Claire A Norris
(74) *Attorney, Agent, or Firm* — NIXON & VANDERHYE

(57) ABSTRACT

A water treatment system for a recirculation aquaculture facility, related method and uses thereof are provided. The
(Continued)

water treatment system included a water pre-treatment facility and a groundwater recharge arrangement, wherein the water treatment system forms a primary recirculation flow pathway when integrated with the recirculation aquaculture facility, thereupon effluent discharged from the recirculation aquaculture facility is sequentially directed through and back into the recirculation aquaculture facility via a water collecting circuit network to enter the recirculation aquaculture facility as an influent. The secondary recirculation flow pathway is formed internally within the recirculation aquaculture facility.

16 Claims, 2 Drawing Sheets

(51) Int. Cl.
*A01K 61/10* (2017.01)
*C02F 3/30* (2023.01)

(58) Field of Classification Search
USPC .............................. 119/215; 210/170.02, 602
See application file for complete search history.

(56) References Cited

U.S. PATENT DOCUMENTS

2013/0277302 A1 10/2013 Doelle et al.
2018/0125041 A1* 5/2018 Holm ................... A01K 63/045
2018/0170779 A1 6/2018 Nickerson et al.

FOREIGN PATENT DOCUMENTS

| CN | 104787895 | | 7/2015 |
| CN | 105753167 | | 7/2016 |
| FR | 2490623 A1 * | 3/1982 |
| WO | 2014/183765 | | 11/2014 |

OTHER PUBLICATIONS

Prince et al., English machine translation FR 2490623 A1, pp. 1-4 (Year: 1982).*
International Search Report for PCT/EP2019/070988 dated Oct. 30, 2019, 4 pages.
Written Opinion of the ISA for PCT/EP2019/070988 dated Oct. 30, 2019, 7 pages.
Finnish Search Report for FI 20185673 dated Mar. 4, 2019, 2 pages.
Finnish Office Action for FI 20185673 dated Mar. 4, 2019, 7 pages.

* cited by examiner

WATER TREATMENT SYSTEM FOR A RECIRCULATION AQUACULTURE FACILITY

CROSS-REFERENCE TO RELATED APPLICATIONS

This application is the U.S. national phase of International Application No. PCT/EP2019/070988 filed Aug. 5, 2019 which designated the U.S. and claims priority to FI 20185673 filed Aug. 6, 2018, the entire contents of each of which are hereby incorporated by reference.

FIELD OF THE INVENTION

Generally invention relates to water treatment systems and methods exploited in cultivation of aquatic species. In particular, the present invention concerns a water treatment system based on a closed cycle recirculation concept and utilizing the methods of passive water treatment, said system being configured for integration with a recirculation aquaculture facility.

BACKGROUND

Aquaculture, generally referred to as farming of aquatic organisms, such as fish and shellfish, under controlled conditions, is a fast-growing agricultural sector that allows for harvesting seafood for human and animal consumption. By means of aquaculture a variety of aquatic species can be produced in a cost-effective manner and with predictable yields regardless of external conditions, such as weather and/or population fluctuations.

Fish is consumed as food merely worldwide; thereby, fish farming constitutes nowadays a major share in the total aquaculture production, as wild fish stocks are increasingly depleted. From aquaculture facilities fish is supplied to the consumer market; additionally, reared in fish nurseries juveniles can be transplanted/released into the natural environment to replenish wild populations.

In recent decades, fish harvesting in recirculation aquaculture facilities has gained popularity and profitability over traditional rearing of fish in open ponds or raceways. A recirculation aquaculture facility configured as a Recirculation Aquaculture System (RAS), is generally referred to as an indoor or outdoor installation-dependent fish harvesting plant integrated with a recirculating water treatment system. Water is supplied into the RAS-plant from a nearby waterway, reservoir or a borehole (e.g. groundwater), into where (waste)water is discharged after use (additionally, wastewater can be directed to industrial- and municipal purification facilities). Nevertheless, amount of water utilized by the RAS-plant is up to 100 times lower in comparison to a flow-through facility, for example, as water circulates within a predetermined space in a closed cycle (recirculation loop).

An exemplary fish farming plant exploiting RAS-technology is described in the International application publication WO 2014/183765 (Urup).

In RAS systems, recirculating water undergoes a number of treatments, typically prior to entering the fish harvesting plant (influent) and after being discharged therefrom (effluent), wherein fish harvesting plant comprises an at least one fish tank, and it can be optionally configured as a fish farm. Said treatments are generally classified as active treatments, thereupon energy and/or reagents are supplied into a process on a regular basis, and the process is continuously monitored. Influent is pumped, filtered, disinfected by ozonizing or UV-irradiation, aerated, purified mechanically, chemically and/or biologically and optionally supplied with pure oxygen. Prior to entering some treatment stages additional heating or cooling of water is necessary. Whether a biological treatment is involved, such as nitrification utilized for bacterial conversion of ammonium to nitrates, for example, the process requires further addition of alkaline compounds, such as calcium carbonate, sodium bicarbonate or sodium hydroxide, in order to maintain water pH at a level suitable for cultured fish and nitrifying microorganisms.

Effluent, in turn, contains phosphorus and nitrogen, whose discharge into environment can cause hypoxic (low oxygen) conditions negatively affecting aquatic life. Therefore, before discharging water is supplied with precipitation- and flocculation chemicals, followed by filtering phosphor-containing solids therefrom. Effluent can be further supplied with methanol as an external supplemental carbon source for denitrification (removal of nitrogen). In some instances, more advanced technologies, including membrane filtration by reverse osmosis and nanofiltration, for example, are further utilized with regard to both influent and effluent.

Above described recirculation aquaculture facilities are constrained with several common drawbacks. Thus, multi-stage water treatment installations require significant investments, as each (active) treatment stage employed in the exemplary RAS-plant is associated with significant cost effects implied by equipment costs and operating expenses, the latter being imparted by continuous and high power supply, as well as notable maintenance costs. Advanced technologies, such as the abovementioned membrane filtration, impose higher equipment investments, indeed. Hence, current state of technology limits utilization of recirculation aquaculture systems with regard to fish harvesting merely to rearing valuable fish species at relatively high costs.

Additionally, conventional RAS-facilities lack authority approval for manufacturing aquatic species that could be certified as organic.

SUMMARY OF THE INVENTION

An objective of the present invention is to at least alleviate each of the problems arising from the limitations and disadvantages of the related art. The objective is achieved by various embodiments of a water treatment system provided in one aspect of the invention, according to what is defined in the independent claim 1.

In preferred embodiment the water treatment system is provided, which comprises: (a) a water pre-treatment facility with an at least one wetland refinery cell, and/or (b) a groundwater recharge arrangement located downstream of said pre-treatment facility, wherein the water treatment system forms a primary recirculation flow pathway when integrated with a recirculation aquaculture facility, thereupon effluent discharged from the recirculation aquaculture facility is sequentially directed through (a) and/or (b) back into the recirculation aquaculture facility via a water collecting circuit network to enter the recirculation aquaculture facility as an influent.

In some embodiments, the water treatment system further comprises an additional pre-treatment facility configured as an at least one denitrification bioreactor.

In some embodiments, the water treatment system further comprises an at least one wetland refinery cell configured for anaerobic reactions and/or an at least one wetland refinery cell configured for aerobic reactions. In some embodiments, said pre-treatment facility comprises a number of wetland refinery cells configured for anaerobic denitrification and/or aerobic nitrification. In further embodiments, said pre-treatment facility comprises an at least one wetland refinery cell configured as a recharging infiltration basin.

In some embodiments, the groundwater recharge arrangement provided within the water treatment system comprises means for water infiltration and percolation provided as an at least one filter bed in the form of a sand filter layer and/or a gravel filter layer. In some embodiments, the groundwater recharge arrangement is laid beneath the pre-treatment wetland facility. In some other embodiments, the pre-treatment wetland facility and the groundwater recharge arrangement are located in sequence.

In still further embodiments, the water treatment system comprises an alkalinity producing system. Said alkalinity producing system can be selected from: an Anoxic Limestone Drain (ALD) system, an Oxic Limestone Drain (OLD) system, a Reducing and Alkalinity-Producing System (RAPS), a Vertical Limestone Drain (VLD) system and/or a Lightweight Aggregate (LWA) filter-based system. The alkalinity producing system is preferably provided in the form of a replaceable reservoir.

In some embodiments, the water treatment system comprises the recirculation aquaculture facility integrated therewithin. Said recirculation aquaculture facility preferably comprises a recirculating water plant for harvesting aquatic species integrated with a recirculating water treatment system, thereupon a secondary recirculation flow pathway is formed internally within said recirculation aquaculture facility.

In another aspect, a method for treating water discharged from the recirculation aquaculture facility is provided, according to what is defined in the independent claim 15, wherein effluent discharged from said recirculation aquaculture facility is allowed to flow sequentially through at least the pre-treatment facility and the groundwater recharge arrangement, thereafter water recovered from said recharge arrangement is directed back into the recirculation aquaculture facility via a water collecting circuit network to enter said recirculation aquaculture facility as an influent.

In still further aspect, use of the water treatment system in aquaculture is provided, according to what is defined in the independent claim 16. In preferred embodiment said use concerns harvesting fish and/or crustaceans.

The utility of the present invention arises from a variety of reasons depending on each particular embodiment thereof.

The inventive concept disclosed hereby combines the methods of passive water treatment exploited in wastewater processing (wetland refineries), in production of drinking water (groundwater recharge) and in mine water processing, to implement a so called closed-loop external water treatment system applicable in rearing aquatic species, such as fish and/or crustaceans, in conditions of the recirculation aquaculture facility. Upon exploiting the methods of passive water treatment, significant costs savings related to reduced consumption of energy, water and consumables, such as nutrients and/or processing chemicals, can be attained. Said passive treatments are self-sustaining processes; thereby they usually function faultlessly without- or with minimal human interference, once established, and require only occasional maintenance.

The water treatment system further comprises means for thermal energy reclamation, and acts as a heat exchanger that saves primary energy resources and reduces carbon dioxide emissions. The system is thus self-sufficient in terms of mediating heating and cooling of the aquaculture facility integrated therewithin and/or the neighborhood buildings, for example.

The water treatment system can be further configured for manufacturing useful by-products, such as biomass, which can be further utilized for production of fodder and biogas fuel. By the way of an example, the constructed wetland refinery cells provided with the present system have a pronounced potential to produce renewable energy at a wide range of scales, thereby allowing for saving nature resources, such as water and organic carbon as a fossil fuel source, for example.

The water treatment system disclosed hereby is based on a closed-loop water (re)circulation concept. In this regard, the aquaculture facility for rearing aquatic species, such as fish, when integrated into said system, is almost nutrient emission-free with (inflow) water consumption and wastewater/sludge production minimized.

Reduced water usage allows for intensive fish- and/or other aquatic cultures production without jeopardizing environmental sustainability. Due to minor water consumption and—nutrient discharge, localization of the aquaculture facility on terrain is more flexible in comparison to the existing plants.

Within said closed recirculation loop concept, the water treatment system provided hereby thus combines at least such functions as: processing water entering the aquaculture facility; processing wastewater discharged from said aquaculture facility, and regulating recirculated water temperature. Water recirculated within the aquaculture facility in a closed cycle (internal pathway) is discharged into the external water treatment system, according to the present disclosure, in where water is again recirculated in a closed cycle (external pathway) and returned back to the aquaculture facility.

Provision of two water recirculation pathways (external and internal) running in parallel further improves risk management.

The system and method provided hereby thus allow for more cost-effective water processing, improved water quality and reduced environmental loading. This enables setting up an aquaculture facility that may fulfill the requirements for certified organic production. It should be noted that manufacturing of certified organic products in conventional RAS-facilities still lacks approval by the authorities.

The expression "a number of" refers hereby to any positive integer starting from one (1), e.g. to one, two, or three. The expression "a plurality of" refers hereby to any positive integer starting from two (2), e.g. to two, three, or four.

The terms "first" and "second", are used hereby to merely distinguish an element from another element without indicating any particular order or importance, unless explicitly stated otherwise.

The terms "upstream" and "downstream" are used hereby to indicate the order of elements with regard to one another; thereby the term "upstream" is indicative of a position prior to some particular element or facility, and the term "downstream"—of a position after some particular element or facility.

The terms "aerobic" and "anaerobic" refer in the present disclosure to water (pre)treatment processes that proceed in the presence of oxygen (aerobic) or in an absence thereof (anaerobic). The term "anoxic" is used hereby primarily in the same meaning as "anaerobic".

The term "aquifer" refers hereby to an underground layer of water-bearing, substantially permeable soil, sand or gravel; whereas the term "groundwater" refers to water that exists beneath the earth's surface in said aquifers.

Different embodiments of the present invention will become apparent by consideration of the detailed description and accompanying drawings.

DETAILED DESCRIPTION OF THE DRAWINGS

Figure 1:
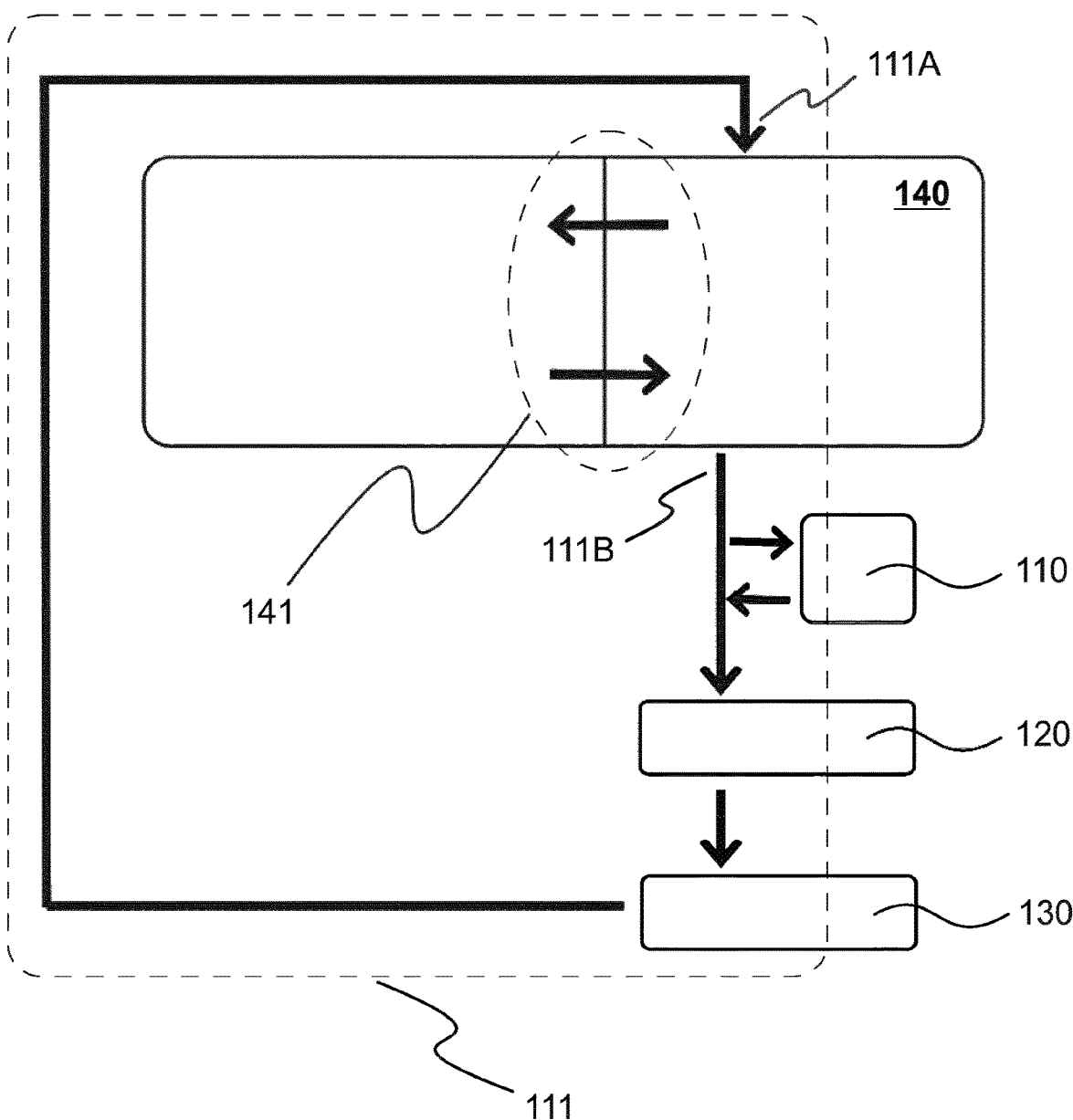
FIG. 1 schematically illustrates a basic concept of a water treatment system 100 according to some aspect of the invention.

Detailed embodiments of the present invention are disclosed herein with the reference to accompanying drawings. The same reference characters are used throughout the drawings to refer to same members. Following citations are used for the members:
- 100—a water treatment system;
- 110—an additional pre-treatment facility/denitrification bioreactor;
- 111—a primary (external) recirculation flow pathway;
- 111A, 111B—influent and effluent, accordingly, with regard a recirculation aquaculture facility;
- 120—a water pre-treatment facility;
- 120A, 120B—wetland cells refinery cells configured for anaerobic and aerobic reactions;
- 130—an artificial groundwater recharge arrangement;
- 131—an alkalinity producing system;
- 140—a recirculation aquaculture facility;
- 141—a secondary (internal) recirculation flow pathway;
- 142—a recirculating water plant for harvesting aquatic species;
- 143—a recirculating water treatment system within the recirculation aquaculture facility 140;
- 151—a water collecting circuit network.

FIG. 1 illustrates, at 100, a concept underlying various embodiments of a water treatment system (hereafter, the system 100), in accordance with one aspect of the present invention. In one preferred embodiment the water treatment system 100 comprises a pre-treatment facility 120 and a groundwater recharge arrangement 130, the latter constructed based on the principles of artificial aquifer recharge exploited in producing drinking water.

The system 100 is advantageously implemented based on the methods of passive water treatment; thereupon water is routed or allowed to flow through a number of constructed (manmade) facilities without- or with minimal consumption of energy and/or nutrients and with only occasional maintenance.

The system 100 is constructed based on a so called closed pathway (closed-loop) recirculation concept; thereby water circulates within said system in an essentially closed cycle. By the term "essentially closed cycle" we refer to a system configuration, in which water is refreshed to a certain extent, and which comprises a number of additional arrangements, such as injection- and/or infiltration wells, trenches, pipelines, sprinkler irrigation devices etc., disposed along the recirculation pathway for water intake and/or withdrawal. The system thus allows for refreshing water upon completion of a predetermined number of cycles, upon passing through a predetermined amount (e.g. liters or tons) of water, and the like. Additionally or alternatively water can be refreshed to some extent during the cycles.

The system 100 is advantageously configured to integrate with a recirculation aquaculture facility 140. In some embodiments the system 100 comprises the recirculation aquaculture facility 140 integrated therewithin.

The system 100 is further configured to form a primary recirculation flow pathway 111 (primary recirculation loop) when integrated with the recirculation aquaculture facility 140 (FIG. 1). A secondary recirculation flow pathway 141 (secondary recirculation loop) is formed internally within said recirculation aquaculture facility, accordingly (FIG. 1).

The pre-treatment facility 120 comprises an at least one wetland refinery cell. In preferred configurations, the wetland refinery cell is a constructed wetland refinery cell. In some other instances, the wetland refinery cell can be configured as a human-modified ecosystem. By the term "human-modified ecosystem", we refer to a natural ecosystem that has been subjected to certain modifications to become a part of the water treatment system 100. Such modifications may include provision of a pipework for water flow, optionally pumping system(s), and the like.

Constructed wetlands are engineered systems built to utilize the treatment processes available in natural wetlands in a controlled and predictable manner. A single constructed wetland refinery cell (hereafter, a wetland cell) can be configured as an excavated basin or pond or as a constructed dike. Such a wetland cell is a complex, integrated system involving water, a substrate, plants (higher plants and algae), and microorganisms, wherein the latter typically develop naturally.

In some instances, the wetland cells are sealed from beneath by clay, fractured rock, or synthetic liners, such as plastic membranes, for example, to avoid contamination and/or prevent groundwater from infiltrating to the wetland. In such a case, water treated within the wetland is routed in a substantially horizontal direction towards the groundwater recharge arrangement 130, as described hereinbelow. Nevertheless, in certain instances it may be advantageous to allow water treated within the wetland to infiltrate to groundwater; thereby, the at least one wetland cell within the pre-treatment facility 120 is configured as a recharging (allowing for artificial groundwater recharge) infiltration basin with a permeable bottom. In a latter instance, water treated within the wetland cell is routed or is allowed to infiltrate underground, to groundwater or aquifer(s).

Therefore, the wetland refinery cells can be configured as horizontal flow constructed wetland cells, vertical flow constructed wetland cells or a combination thereof.

It is preferred that the pre-treatment facility 120 comprises an at least one wetland cell configured for aerobic reactions and/or an at least one wetland cell configured for anaerobic reactions. Thus, the pre-treatment facility 120 may be configured as an anaerobic constructed wetland; an aerobic constructed wetland, or as a combination thereof. In some embodiments, the pre-treatment facility 120 comprises wetland cells configured for anaerobic reactions and wetland cells configured for aerobic reactions.

Figure 2:
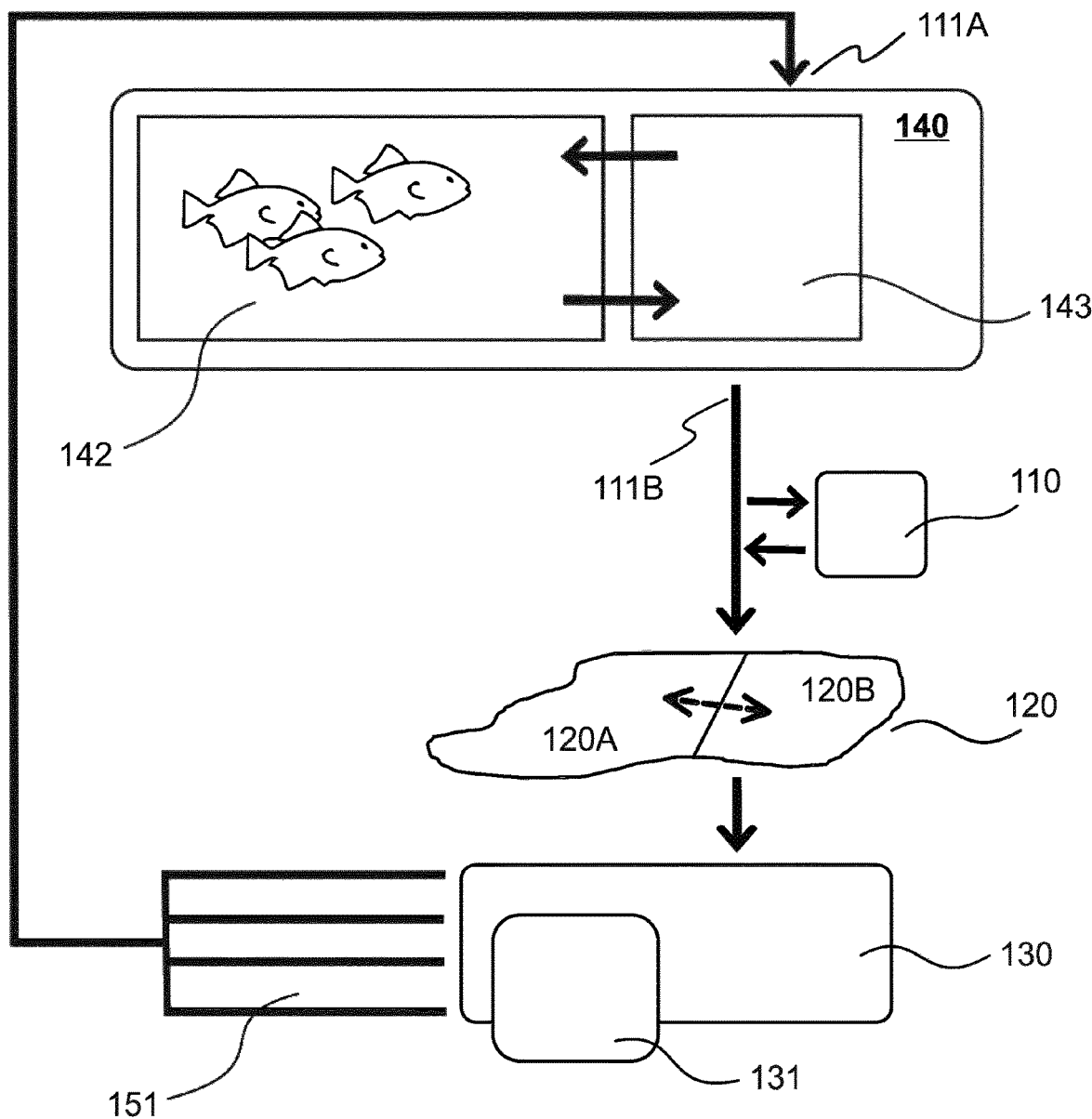
FIG. 2 schematically illustrates various embodiments of the water treatment system 100.

A system comprising the pre-treatment facility 120 combining the aerobic and anaerobic wetland cells is shown on FIG. 2, wherein reference numerals 120A and 120B indicate anaerobic and aerobic wetland cells, accordingly.

In some embodiments, the pre-treatment facility 120 comprises a number of constructed wetland refinery cells configured for anaerobic denitrification 120A and aerobic nitrification 120B (FIG. 2). Nitrogen enters said wetland cells 120A and/or 120B, localized downstream the aquaculture facility 140, primarily in the form of ammonium/ammonia ($NH_4^+/NH_3$) and nitrate ($NO_3^-$). In the aquaculture facility 140 organic nitrogen is present in the form of ammonia, urea, uric acid, etc. Within wetlands said ammonium- and/or nitrate-bound nitrogen is converted into gaseous components that are expelled into the atmosphere as nitrogen gas ($N_2$) or nitrogen oxide ($N_2O$).

During nitrification nitrogen gas is formed upon biological conversion (hereby, oxidation) of ammonium, via nitrite, to nitrate. Such conversion occurs in the wetland cell or upon aquaculture production; and may result in substantial amounts of nitrates in effluent water. Nitrification naturally produces nitric acid; thereby effluent discharged from the nitrification process has reduced alkalinity and pH at a level of about 6.5-7.5. The term "alkalinity" describes hereby a measure of water capacity to neutralize acids. Nitrification process proceeds stepwise according to formula (1):

$$NH_4^+ + 1.5O_2 \rightarrow 2H^+ + H_2O + NO_2^- \quad (1)$$

$$NO_2^- + 0.5O_2 \rightarrow NO_3^-$$

As mentioned above, effluent that could enter the wetland cell configured for (aerobic) nitrification 120B would contain ammonia/ammonium and nitrate. The latter results from nitrification process naturally occurring during aquaculture production; thereby effluent 111B discharged from the recirculation aquaculture facility 140 may be rich in nitrate-bound nitrogen prior to entering the wetland cell(s).

Pure oxygen can be supplied into the nitrification process by means of an oxygen generator and/or via a liquid oxygen tank.

In some exemplary embodiments, the constructed wetland refinery cell 120B for aerobic nitrification can be configured as a shallow excavated basin (typically, 6-30 cm deep), filled with a water layer flooding the substrate planted with aquatic vegetation. In addition to aforesaid oxidation reactions (ammonium- and metal oxidation), aerobic wetland cells promote metal hydrolysis followed by metal removal by precipitation of insoluble metals compounds (e.g. hydroxides), ion exchange and organic complexation, as well as biological retention of phosphorus and filtration of suspended matter. Still, aerobic wetlands do not generate alkalinity (on the contrary to anaerobic wetlands, as discussed hereinbelow).

In preferred configurations, nitrate nitrogen-rich water undergoes anaerobic denitrification in the wetland cell 120A. Generally known as removal of nitrogen, denitrification is a process of biological reduction of nitrate ($NO_3$) to nitrogen gas ($N_2$) by denitrifying microorganisms under anaerobic conditions, according to formula (2). Denitrification is an alkalinity producing process accompanied by the increase in pH value to about 7.0-8.5, accordingly.

$$2NO_3^- + H^+ + \text{carbon source} \rightarrow N_2 + HCO_3^- \quad (2)$$

For denitrification to proceed, a carbon source is required. Said carbon source may be organic matter present in the wetland and/or a supplemental carbon source. The latter, in the form of added plant biomass, methanol or glucose, for example, may be added into the anaerobic denitrification wetland cell.

In the configuration shown on FIG. 2, effluent 111B discharged from the recirculation aquaculture facility 140 can enter the pre-treatment facility 120 via the denitrification wetland cell 120A, the nitrification wetland cell 120B or both. Moreover, outflow from the nitrification wetland cell 120B can be routed into the denitrification wetland cell 120A; and other way round, whether appropriate. In this regard, in various configurations the system 100 can comprise the denitrification wetland cell or cells 120A preceding- or subsequent to the nitrification wetland cell or cells 120B. Several anaerobic (denitrification) and aerobic (nitrification) wetland cells can be arranged in series, one after another such, as to create sequential aerobic-anaerobic or anaerobic-aerobic water treatment systems. Said wetland cells are preferably connected to each other such, that water to be treated is routed slowly or allowed to flow by gravity to establish horizontal and/or vertical flow through, accordingly. In order to implement unobstructed flow through the wetland cells, the system 100 is preferably equipped with a variety of water flow pathway(s), cascades, slopes, pipework(s), optionally pumping system(s), and the like.

In some exemplary embodiments, the constructed wetland refinery cell 120A for anaerobic denitrification can be configured as an excavated basin or pond, for example, comprising a 30-60 cm thick layer of permeable organic substrate (e.g. compost, peat, hay, sawdust, and the like) with or without plants. A layer of water (typically at least 30 cm or deeper) is formed over the organic substrate layer. Water infiltrates into the organic substrate, which becomes anaerobic by eliminating dissolved oxygen and generating alkalinity chemically and/or biologically.

In some embodiments the system 100 further comprises an additional pre-treatment facility 110 (FIGS. 1, 2). Said additional pre-treatment facility 110 is preferably configured as an at least one denitrification bioreactor. By means of the bioreactor 110 denitrification process can be accelerated and its efficiency can be improved.

In some embodiments the system 100 may be configured such, that provision of the bioreactor 110 is optional. In preferred embodiments, the bioreactor 110 is provided within the system 100 and connected with the primary recirculation pathway 111 at need. In such an instance, effluent 111B from the recirculation aquaculture facility 140 is routed to the pre-treatment facility 120 directly or via the denitrification bioreactor 110. Routing of effluent into the bioreactor 110 may be realized via a common conduit, as shown on FIGS. 1 and 2, or via a separate pipeline. The pre-treatment facility 120 may be further configured such that the at least one wetland cell is configured to receive outflow directly from the recirculation aquaculture facility 140; and the at least one another wetland cell is configured to receive outflow from the bioreactor 110 (not shown). Still, the system 100 is preferably flexibly adjustable such as to connect bioreactor 110 with the primary recirculation loop 111 at any time, permanently or temporarily. Temporary addition of the bioreactor 110 into the primary recirculation loop 111 is beneficial when the wetland cell(s) 120A configured for anaerobic reactions is/are not available/under maintenance; whereas permanent addition of the bioreactor 110 into the primary recirculation loop 111 is feasible in a case, when the pre-treatment facility 120 is restricted to aerobic wetland cells only.

The bioreactor is preferably configured as a passive denitrifying filter utilizing a biomass-derived carbon source. Denitrifying filter medium is preferably wood chips; however, straw-based filter medium, for example, or any other appropriate carbon source(s) are not excluded.

In preferred embodiments, the denitrification reactor 110 is configured as comprising woodchip filter medium augmented by carbon from methanol. Wood chips may be obtained from broad-leaved trees, such as birch, for example, or from coniferous trees, such as pine and/or spruce.

Use of methanol ($CH_3OH$), as an external supplemental carbon source, is preferred because of its cost-effectiveness in terms of a cost per a unit of weight (gram or kilogram, for example) and a cost per a unit of weight of nitrate removed. Nevertheless, use of alternative carbon sources, such as ethanol, glycerol, and the like, is not excluded, whether appropriate.

The denitrification woodchip bioreactor 110 can be further paired with a phosphorus-sorbing filter or filters (not shown). The latter can be placed upstream or downstream the denitrification bioreactor 110.

The bioreactor 110 and the wetland-based pre-treatment facility 120 generally mediate the treatment of wastewater (effluent 111B), with regard to the recirculation aquaculture facility 140.

In some embodiments the pre-treatment facility 120 can be further configured to produce biomass as a by-product. Biomass harvested in constructed wetland refinery cells can be used for the production of fodder and fuel (e.g. biogas). Plant species common to natural wetlands, such as belonging to genera of *Typha, Arundo, Schoenoplectus, Spartina, Phragmites, Juncus, Cyperus, Eleocharis*, and the like, can be harvested. Selection of plants can be based on energy yield, measured as the production of dry biomass per unit area and time, for example tons per hectare per year.

In some embodiments, the system 100 further comprises the groundwater recharge arrangement 130 located downstream the pre-treatment facility 120. Still, the system 100 may be implemented without the arrangement 130. In preferred configurations, the arrangement 130 is configured as an artificial groundwater recharge arrangement. The term "artificial groundwater recharge" is used hereby with a reference to human-assisted and/or human-controlled (i.e. "artificial") process, as generally exploited in drinking water production, in which surface water is routed or allowed to flow underground through a porous filter layer, therefrom thus purified water can be recovered. Still, in some instances, said groundwater recharge arrangement can be configured as a human-modified ecosystem.

In some embodiments the artificial groundwater recharge arrangement 130 comprises means for water infiltration and percolation provided as an at least one porous filter (infiltration) bed, preferably a subsurface filter bed. The term "infiltration" is used hereby to indicate movement of water into the substrate surface; whereas the term "percolation" is used to indicate the movement of water within (through) said substrate. Said at least one filter bed can be provided in the form of a sand filter layer and/or a gravel filter layer. Filter layers may be arranged on the top of one another. In some instances, the filter bed may be configured as a slow sand filter (flowthrough rate about 0.1 meter per hour (m/h)) or as a rapid sand filter (flowthrough rate about 4-21 m/h). In some instances, the arrangement 130 can further include an activated filter layer, such as an activated carbon filter layer.

The artificial groundwater recharge arrangement 130 can thus be configured as a shallow basin or a contour comprising the aforesaid infiltration bed placed on the bottom of said basin or, alternatively, beneath an engineered layer of highly pervious soil media and vegetation. Moreover, said artificial groundwater recharge arrangement 130 can underlie the constructed wetland cell(s), thereby water pretreated (clarified) in said wetland cell(s) is routed or allowed to flow through the filter layer(s) to achieve higher degree of purification.

In some embodiments the system 100 is thus configured such, that the artificial groundwater recharge arrangement 130 comprising said at least one filter/infiltration layer made of sand, for example, underlies the at least one wetland cell 120A, 120B provided within the pre-treatment facility 120.

In this regard, it is desirable that the wetland cell(s) 120A, 120B having the underlying infiltration layer 130 is/are configured as a recharging infiltration basin. Said a configuration allows for constructing so called hybrid constructed wetlands that combine vertical- and horizontal flow therewithin, thereby water is routed or allowed to flow vertically down towards and through the infiltration layer within the groundwater recharge arrangement 130 and/or horizontally in a direction of the subsequent wetland cell within the pretreatment facility 120.

In some other additional or alternative embodiments the system 100 can be configured such that the pre-treatment facility 120 and the artificial groundwater recharge arrangement 130 are located in sequence. The system may thus be configured to combine an at least one wetland cell with the infiltration layer laid underneath, and an at least one other wetland cell located upstream the artificial ground recharge arrangement 130.

The arrangement 130, in turn, is advantageously connected to a water collecting circuit network 151 (FIG. 2) provided within the system 100 such as to establish a technical basis for the primary recirculation flow pathway 111 (FIG. 1). The network 151 extends substantially along the filter bed bottom and supports water collection and distribution. The artificial groundwater recharge arrangement 130 may be further equipped with a number of injection and/or infiltration wells, trenches, pipelines, sprinkler irrigation devices, and similar equipment, which is also configured to communicate with the water collecting circuit network 151. The water collecting circuit network 151 advantageously comprises subsurface (underground) and overground components.

Water recovered from the infiltration process, implemented via the aforesaid artificial groundwater recharge mechanisms, is improved chemically and microbiologically even in comparison with native groundwater. The arrangement 130 thus allows for efficient retention and decomposition of total organic carbon (TOC), microbes, persistent organic pollutants (POPs), such as polychlorinated biphenyls, dioxins, chlorinated hydrocarbons, and aquaculture related contaminants, such as antibiotics and hormones, for example. Artificial groundwater recharge arrangement 130 can be further exploited in getting rid of compounds causing adverse scents, such as geosmins, for example; thereby a need in constructing a separate water treatment unit, such as a disinfection facility, can be eliminated.

The system 100 may be further configured to comprise an optional heat pump system (not shown), preferably configured to exploit geothermal energy. The heat pump system is advantageously implemented as comprising a number of heat pump devices connected to the subsurface water collecting circuit network 151. Said circuit network 151 or a subsurface part thereof acts as a heat exchanger, thereby, the heat pump system us fully integrated into the system 100. In some embodiments, treated water routed or allowed to flow via the subsurface pathways laid underneath the artificial groundwater recharge facility 130 is used as a heat source or a heat sink. Hence, during summer heat from the environment is transferred to the (treated) water collecting circuit network 151 and therefrom dispersed to soil and groundwater. In winter the process is reversed, thereby thermal energy stored in relatively warm ground raises the temperature of treated water in the circuit network 151, which transfers, in turn, this energy to the heat pump(s). The heat pump system may be used for heating and cooling the aquaculture facility 140 for example, as well as the buildings located around the system 100. Nevertheless, location of the heat pumps within the system 100 is not restricted with the terrain occupied by the artificial groundwater recharge facility 130.

The subsurface water collecting circuit network 151 can be further implemented in an absence of the heat pump system.

The artificial groundwater recharge arrangement 130 generally mediates the treatment of inflow/influent 111A, with regard to the recirculation aquaculture facility 140.

The system 100 is configured to further comprise an alkalinity producing system 131 (FIG. 2). In fact, alkalinity is generated within the system 100 already during denitrification reactions proceeding in the anaerobic constructed wetland cell(s) 120A or in the denitrification reactor 110. However, in some instances additional or alternative alkalinity producing means may be required, to convert substantially acidic water into water with an excess of alkalinity. The alkalinity producing system 131 is preferably selected from: an Anoxic Limestone Drain (ALD) system, an Oxic Limestone Drain (OLD) system, a Vertical Limestone Drain (VLD) system, and/or a Reducing and Alkalinity-Producing System (RAPS). The RAPS system is also referred to as a Successive Alkalinity-Producing System (SAPS).

The alkalinity producing system 131 can be further configured as a Lightweight Aggregate (LWA) granular filter-based system, such as LWA gravel, Leca (Light Expanded Clay Aggregate) gravel, or a lightweight aggregate made of clay occurring in Finland (known for its' extremely lightweight and slow wetting). Said LWA system is preferably supplied with a calcium compound, in the form of calcium hydroxide $Ca(OH)_2$, for example. Upon addition of calcium hydroxide to said granular LWA filter pre-wetted by water, calcium hydroxide degrades to calcium ions and hydroxide ions, thereby pH value of the filter increases. Additionally said calcium-supplied LWA filter is known for its' phosphorus retention capacity.

In some preferred embodiments, said alkalinity producing system 131 is provided in a replaceable reservoir, or a so called cassette. It is preferred that the replaceable reservoir is installed subsurface.

An exemplary ALD system consists of an excavated drain filled with limestone gravel with high calcium carbonate content or with other carbonated material and impermeably sealed from atmospheric oxygen to maintain anaerobic or anoxic (oxygen-depleted) conditions. Influent entering the ALD system is generally anoxic. Treated water flows through the drain causing limestone dissolution, thereupon alkalinity is generated and the water pH is increased, accordingly. An exemplary OLD system is based on the same principle as the ALD system, with an exception that the influent entering thereto contains oxygen. An exemplary RAPS/SAPS system combines the ALD and the anaerobic wetland technologies and consists of a reservoir (1-3 m deep, for example) and deposited with limestone (0.5-1 m thick, for example) overlain with an organic substrate (e.g. compost). The system further comprises a pipework laid below the substrates to convey water therethrough. An exemplary Vertical Limestone Drain (VLD) system is constructed in the same manner as the aforesaid RAPS/SAPS system except that the provision of organic substrate is hereby omitted.

Location of the alkalinity producing system 131 within the system 100 is configuration-specific. In preferred embodiment the alkalinity producing system 131 implemented as a replaceable subsurface cassette is positioned within the area occupied by the artificial groundwater recharge arrangement 130 (FIG. 2). In some further embodiments the alkalinity producing system 131 can be installed prior to—(upstream), subsequently-(downstream) or within the area occupied by the constructed wetlands 120A, 120B. Thus, the Anoxic Limestone Drain system can be installed within the anaerobic wetland cell 120A, for example.

In some other exemplary embodiments, the alkalinity producing system 131 may be installed subsequently to the denitrification bioreactor 110 configured as a denitrifying (bio)filter, as described hereinabove. Anoxic (oxygen-depleted) and carbon dioxide-containing effluent obtained from said bio filter has been shown to effectively dissolve calcium carbonates.

With reference back to FIG. 1, provision of the system 100 is such that a primary recirculation flow pathway 111 is formed, when the system 100 is integrated with a recirculation aquaculture facility 140. In such as configuration, effluent 111B discharged from the recirculation aquaculture facility is sequentially directed through the at least the pre-treatment facility 120 and the artificial groundwater recharge arrangement 130, back into the recirculation aquaculture facility 140 via the water collecting circuit network 151, and enters the recirculation aquaculture facility as an influent 111A.

In preferred embodiment the water treatment system 100 comprises the recirculation aquaculture facility 140 integrated therewithin.

Said recirculation aquaculture facility 140 comprises a recirculating water plant 142 for harvesting aquatic species and a water treatment system 143 for processing water recirculating through the plant 142 (FIG. 2). The plant 142 is advantageously implemented as a closed-loop channel/a pipe or as a system of channels/a pipework, thereupon the secondary recirculation flow pathway 141 is formed internally within said recirculation aquaculture facility. The plant 142 is preferably integrated with the recirculating water treatment system 143.

In the system 100 with the aquaculture facility 140 integrated therewithin, water is (re)circulated according to two substantially independent pathways, viz. the primary pathway 111, and the secondary pathway 141. Said pathways are preferably realized as closed pathways, in accordance with the "closed loop" concept described herein above.

Closed circulation/recirculation pathways are accompanied by water processing, wherein the primary pathway 111 employs, on the whole, the methods of passive water treatment, selected from: wetland-assisted refining, (artificial) groundwater recharge and/or alkalinity producing methods, in accordance to what is described hereinabove. The primary pathway 111 is formed within the system 100 and is typically localized outdoors, externally with regard to the aquaculture facility 140.

On the contrary, the secondary pathway 141 is localized internally, within the aquaculture facility 140. Location of the secondary pathway 141 with regard to the environment depends on whether the aquaculture facility 140 is an indoors or an outdoors facility. In preferred embodiments, the aquaculture facility 140 is the indoors facility, thereby the secondary pathway 140 is disposed within a building occupied by said facility.

The secondary pathway 141 involves processing of water entering and being discharged from the aquatic species harvesting plant 142, accordingly. Internal water processing involves, on the whole, the methods of active water treatment. Whereas in the passive methods involved in the external pathway 111 water is routed or allowed to flow through a number of facilities without or with minimal energy and/or nutrient consumption, in the active methods involved in the internal pathway 141 intensive (re)circulation of water between the plant 142 and the (internal) recirculating water treatment system 143 is actively promoted, while being continuously monitored. Active water treatment is generally associated with faster flow rates and higher energy consumption, accordingly. In some exemplary embodiments, water recirculating via the internal treatment system 143 is subjected to a sequence of treatments, including: mechanical and biological filtration, aeration and/or oxidation. The nitrification process, for example, can take place already within the aquaculture facility 140, as described herein above.

The recirculation aquaculture facility 140 can be provided in a variety of configurations and designs. Thus, the facility 140 can be configured as a raceway system, a circular pathway system including substantially round-shaped tanks or rectangular tanks, or as a closed-loop pipeline-based system. Any other feasible configuration can further be utilized. In some embodiments, energy efficiency of the recirculation aquaculture facility 140 can be improved by disposing said facility subsurface (i.e. on an underground level) in order to exploit the temperature-compensating effect of the ground.

In some embodiments, the recirculation aquaculture facility 140 is configured as a Recirculation Aquaculture System (RAS).

Control over directing water flow with regard to the primary recirculation pathway 111 (external) and the secondary recirculation pathway 141 (internal) is advantageously implemented by means of a control system (not shown) and a number of sensor devices, configured to measure a variety of water-related parameters, such as temperature, pH, hardness, content of chemical compounds (ammonia, nitrates, phosphates), and the like. The control system is preferably automated or semi-automated.

All above described components within the water treatment system 100 are fully scalable with regard to one another. In fact, each component 120, 130, 131 within the system 100 may depends on size and production capacity of the recirculation aquaculture facility 140. In some instances, all size-related parameters described hereinabove may be expanded at least ten-fold.

The recirculation aquaculture facility 140 is preferably utilized to harvest aquatic species. It is further preferred that the facility 140 is used for harvesting fish and/or crustaceans (e.g. shrimps, crabs, lobsters, etc).

Fish species suitable for harvesting include, but are not limited to freshwater- and brackish water species, such as Atlantic salmon (*Salmo salar*), Tilapia species, carps (*Cyprinidae*), catfish, and the like; and coldwater species, such as rainbow trout (*Oncorhynchus mykiss*), European whitefish (*Coregonus lavaretus*), perch (*Perca* spp.), pikeperch (*Sander lucioperca*), sturgeon (*Acipenser* spp.), Arctic char (*Salvelinus alpinus*), and the like. For those skilled in the art it is clear that the recirculation aquaculture facility 140 can be adapted for harvesting a variety of fish species, ranging from rearing valuable/difficult-to-harvest fish species at relatively small volumes to harvesting large amounts of fish for mass-market and/or for transplanting into natural environment.

In supplementary or alternative embodiments the aquaculture facility 140 can be used for culturing aquatic species other than fish and crustaceans, such as mollusks (e.g. oysters, mussels), amphibians or aquatic reptiles.

In another aspect, a method for treating water discharged from a recirculation aquaculture facility is provided. In said method, effluent 111B discharged from the recirculation aquaculture facility 140 is allowed to flow sequentially through at least the pre-treatment facility 120 and the groundwater recharge arrangement 130, thereafter water recovered from said groundwater recharge arrangement is directed back into the recirculation aquaculture facility 140 via the water collecting circuit network 151 to enter said recirculation aquaculture facility as the influent 111A.

The aforesaid process follows the primary recirculation flow pathway 111 provided within the system 100. In some further embodiments, treated water is routed or allowed to flow through the additional pre-treatment facility 110 configured as a denitrification bioreactor or a biofilter, and/or any of the alkalinity producing systems described hereinabove.

In further aspect, use of the water treatment system 100 in aquaculture is provided. In preferred embodiment said use concerns harvesting fish and/or crustaceans.

It is clear to a person skilled in the art that with the advancement of technology the basic ideas of the present invention are intended to cover various modifications included in the spirit and the scope thereof. The invention and its embodiments are thus not limited to the examples described above; instead they may generally vary within the scope of the appended claims.

The invention claimed is:

1. A water treatment system for a recirculation aquaculture facility, wherein said system comprises:
    a pre-treatment facility comprising at least one wetland refinery cell,
    a groundwater recharge arrangement, located downstream of the pre-treatment facility, and
    an additional pre-treatment facility configured as an at least one denitrification bioreactor comprising denitrifying filter medium,
    wherein said water treatment system forms a primary recirculation flow pathway when integrated with the recirculation aquaculture facility, thereupon effluent discharged from the recirculation aquaculture facility is sequentially directed through the at least one denitrification bioreactor, the pre-treatment facility and the groundwater recharge arrangement back into the recirculation aquaculture facility via a water collecting circuit network to enter the recirculation aquaculture facility as an influent, and
    wherein the water collecting circuit network is configured as and acts as a heat exchanger.

2. The water treatment system of claim 1, wherein the at least one wetland refinery cell is configured for anaerobic reactions.

3. The water treatment system of claim 1, wherein the at least one wetland refinery cell is configured for aerobic reactions.

4. The water treatment system of claim 1, wherein the pre-treatment facility comprises a number of wetland refinery cells configured for anaerobic denitrification and/or aerobic nitrification.

5. The water treatment system of claim 1, wherein the at least one wetland refinery cell is configured as a recharging infiltration basin.

6. The water treatment system of claim 1, wherein the groundwater recharge arrangement comprises means for water infiltration and percolation provided as an at least one filter bed in the form of a sand filter layer and/or a gravel filter layer.

7. The water treatment system of claim 1, wherein the groundwater recharge arrangement is laid beneath the pre-treatment facility.

8. The water treatment system of claim 1, wherein the pre-treatment facility and the groundwater recharge arrangement are located in sequence.

9. The water treatment system of claim 1, further comprising an alkalinity producing system.

10. The water treatment system of claim 9, wherein said alkalinity producing system is selected from: an Anoxic Limestone Drain (ALD) system, an Oxic Limestone Drain (OLD) system, a Reducing and Alkalinity-Producing System (RAPS), a Vertical Limestone Drain (VLD) system and/or a Lightweight Aggregate (LWA) filter-based system.

11. The water treatment system of claim 9, wherein the alkalinity producing system is provided in the form of a replaceable reservoir.

12. The water treatment system of claim 1, comprising the recirculation aquaculture facility integrated therewithin.

13. The water treatment system of claim 12, wherein said recirculation aquaculture facility comprises a recirculating water plant for harvesting aquatic species integrated with a recirculating water treatment system, thereupon a secondary recirculation flow pathway is formed internally within said recirculation aquaculture facility.

14. The water treatment system of claim 2, wherein the at least one wetland refinery cell is configured for aerobic reactions.

15. A method for treating water discharged from a recirculation aquaculture facility using a water treatment system, wherein said water treatment system comprises:
  a pre-treatment facility comprising at least one wetland refinery cell,
  a groundwater recharge arrangement, located downstream of the pre-treatment facility, and
  an additional pre-treatment facility configured as an at least one denitrification bioreactor comprising denitrifying filter medium,
wherein said water treatment system forms a primary recirculation flow pathway when integrated with the recirculation aquaculture facility, thereupon effluent discharged from said recirculation aquaculture facility is allowed to flow sequentially through the at least one denitrification bioreactor and further through the pre-treatment facility, which comprises at least one wetland refinery cell, and through the groundwater recharge arrangement, thereafter water recovered from said groundwater recharge arrangement is directed back into the recirculation aquaculture facility via a water collecting circuit network to enter said recirculation aquaculture facility as an influent, and
wherein the water collecting circuit network is configured as and acts as a heat exchanger.

16. A method for harvesting fish and/or crustaceans, comprising: providing a recirculation aquaculture facility; treating water discharged from the recirculation aquaculture facility in accordance with the method of claim 15, and harvesting the fish and/or crustaceans from the recirculation aquaculture facility.

* * * * *